Sept. 26, 1967  S. CARANGELO ET AL  3,343,817
APPARATUS FOR MIXING MATERIALS IN THE
SUBSTANTIAL ABSENCE OF AIR
Filed June 29, 1966
FIG.1
FIG.2
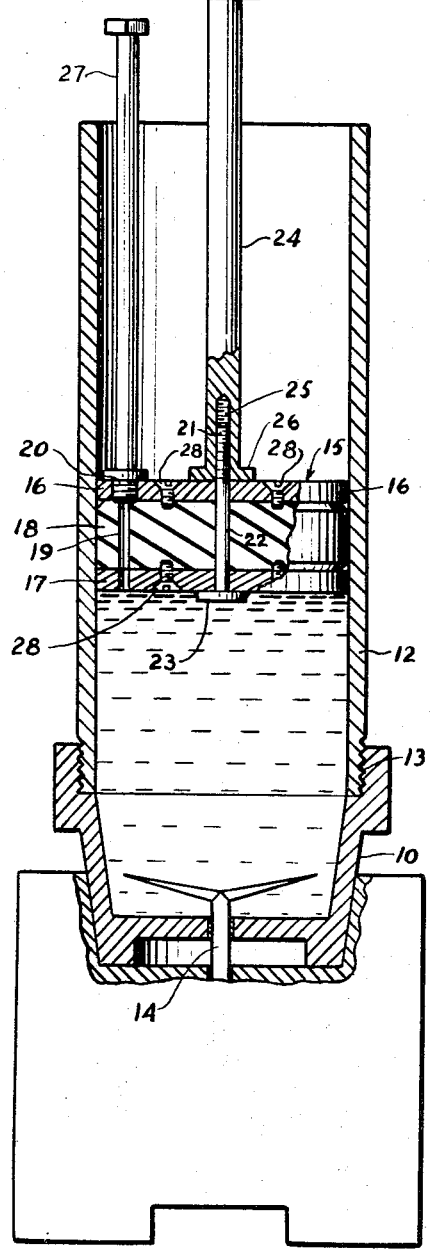
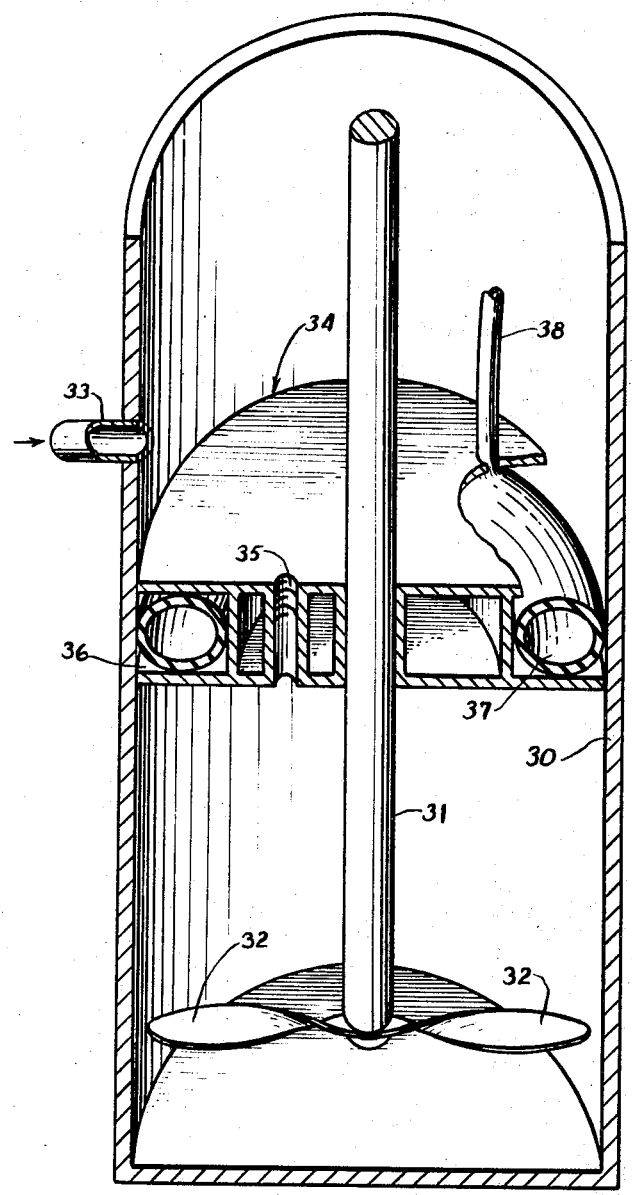

United States Patent Office 3,343,817
Patented Sept. 26, 1967

3,343,817
APPARATUS FOR MIXING MATERIALS IN THE SUBSTANTIAL ABSENCE OF AIR
Salvatore Carangelo, Staten Island, N.Y., and Jerome Fine, Passaic, N.J., assignors to Interchemical Corporation, New York, N.Y., a corporation of Ohio
Filed June 29, 1966, Ser. No. 561,468
5 Claims. (Cl. 259—122)

This invention relates to a novel apparatus for mixing material in the substantial absence of air. More particularly, it relates to apparatus for mixing materials in which the continuous phase is liquid.

In many instances when mixing or preparing emulsions e.g., "oil-in-water" emulsions or water-in-oil emulsions, emulsions of resins in water or dispersions of resins or polymers in organic solvents to be used in inks and coatings, it is often necessary for the mixing to take place in the substantial absence of air or other gases. This is made necessary by the tendency of many of the surface-active agents used in preparing these emulsions and dispersions to emulsify any air or other gas present into the mixture being made as a highly stable emulsion. Such emulsified gases may affect the coatings or prints by forming irregularities and discontinuities in the films such as pinholes. The emulsified gases may also lower the density of inks and coatings to an unsatisfactory degree.

Attempts to eliminate the air through the application of partial vacuum is believed to have been less than fully effective because substantially complete elimination of the air was difficult to achieve. Also the application of vacuum may result in loss of some of the more volatile components.

We have now developed novel apparatus which may be used for mixing materials such as emulsions or dispersions having a continuous liquid phase in the substantial absence of air or other gases.

In general, the apparatus of our invention comprises a substantially cylindrical housing having a closed lower end, agitating or mixing means at said lower end and a piston, elastomeric in character, which rides up and down in said cylinder. The piston has a small aperture passing through it. The diameter of the piston is such that its outer walls abut the inner walls of the cylinder with just sufficient tolerance so that the piston can slide up and down easily. The apparatus further includes means for laterally expanding the elastomeric component of the piston against the walls of the cylinder to frictionally fix the piston in a selected position and to frictionally seal the portion of the cylinder below the piston. The apparatus also includes means for sealing the small aperture.

FIG. 1 shows one preferred embodiment of this dimension in diagrammatic cross section. The cylindrical housing comprises lower portion 10 mounted in base 11 and upper portion 12 which is removable from the lower portion and is joined to said lower portion through screw thread 13. Agitation means 14 comprising a plurality of blades is rotatably mounted at the lower end of the cylindrical housing and is rotated by means not shown contained in base 11. Piston 15 comprises upper disk 16 and lower disk 17 made of a rigid material such as metal. Sandwiched between disks 16 and 17 is intermediate elastomeric disk 18 which may conveniently be made of rubber. Small aperture 19 passes through piston 15 and is shown in the drawing sealed by screw plug 20. The piston is held together by central screw 21 which is mounted within central piston shaft 22. Screw 21 has flange 23 which overlaps and is affixed to lower plate 17. Piston 15 is of such a diameter that its outer walls abut the inner walls of housing 12. However, there is sufficient tolerance so that piston 15 may conveniently be slid up and down within housing 12. The piston is joined to rod 24 by internally threaded shaft 25 at the lower end of rod 24 for receiving screw 21. Flange 26 at the lower end of rod 24 rests against the top of upper disk 16. For convenience in inserting and removing screw plug 20, the screw plug is mounted at the end of rod 27.

In the operation of the apparatus the ingredients to be mixed are placed in the cylindrical housing. Then before the agitation is commenced piston 15 is moved downwardly within housing 12. Screw plug 20 is removed so that small aperture 19 is opened permitting air to escape from beneath the piston. The piston may be conveniently moved by pushing rod 24. Piston 15 is moved down until it is in complete contact with the surface of the ingredients to be mixed contained in the housing. This is readily observable by watching aperture 19 from above. When liquid starts to rise within aperture 19, the surface of the ingredients has been covered by the piston. Screw plug 20 may then be inserted to seal aperture 19. In such a case, a small amount of air may still be present within aperture 19. This amount of air will normally not be detrimental to the mixture being formed. However, if it is believed that even such a small quantity of air would be troublesome, then, before screw plug 20 is inserted, the piston is moved slowly downward until the level of liquid within aperture 19 reaches the point where inserted screw plug 20 would terminate.

Then, the piston is fixed in position by turning rod 24 so that the coupling of rod 24 with screw 21 causes rod 24 to rotate downwardly. Flange 26 applies a downward pressure through disk 16 to elastomeric disk 18 causing the elastomeric disk to expand laterally against the inner walls of housing 12 to fix the piston in position and to frictionally seal the portion of the housing below the piston. It should be mentioned that rivets 28 extending from disks 16 and 17 into elastomeric disk 18 act to prevent any rotational movement of disk 18 with respect to disks 16 and 17.

After the ingredients have been frictionally sealed in the lower portion of the housing, agitation means 14 commences to mix the materials in the substantial absence of air.

If during the mixing cycle, it is found necessary to add more liquid, the liquid is placed in a layer on the upper surface of disk 16. Then screw plug 20 is unscrewed and removed via rod 27. Piston 15 is then slowly raised in the manner described above permitting the liquid layer on disk 16 to pass through aperture 19 and merge with the enclosed liquid. When all of the liquid has passed through aperture 19, screw plug 20 is reset.

FIG. 2 represents a fragmentary perspective section of another embodiment of the present invention. In general, this embodiment operates in the same manner as the embodiment of FIG. 1. Cylindrical housing 30 has central rotatable rod 31 mounted from above by conventional means not shown in such a manner that mixer blades 32 affixed to the lower end of said rod rotate in the lower portion of the housing. Rod 31 is rotatable from above by conventional means not shown. The components to be mixed are fed into the housing through intake pipe 33 when piston 34 is above pipe 33. Piston 34 rides up and down within cylindrical housing 30 along fixed rod 31. As in FIG. 1, the outer diameter of piston 34 is such that it abuts the walls of housing 30 with just sufficient tolerance for the piston to be slidable. Small aperture 35 passes through piston 34 and permits air to escape as the piston moves downward. Piston 34 contains annular recess 36 around its circumference. Inflatable tube 37 which is annular in structure is housed in annular recess 36. Tube 37 may be inflated through conduit 38 which projects through the upper end of piston 34. The embodiment of FIG. 2 operates in a similar manner to that described for FIG. 1. When the materials are being added piston 34 is at the top of housing 30. Then the piston is slowly lowered until it is in contact with and covers the entire surface of the liquid in the housing. This is indicated by a rise of liquid into small aperture 35. At this point aperture 35 is sealed with a plug similar to that described in FIG. 1 and sufficient air is forced into tube 37 through conduit 38 to expand the tube against the walls of housing 30. This frictionally fixes the piston in position and frictionally seals the liquid below the piston. When this is accomplished blades 32 are rotated by means of rod 31 to commence the mixing process.

It should be noted that the apparatus of this invention may also be used to mix controlled volumes of air or other gases with liquids to form emulsions. This may be readily done for example in FIG. 1 by leaving a space of a calculated volume above the liquid which is enclosed below the piston and filling said space with air or another gas.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. Apparatus for mixing materials having a continuous liquid phase which comprises a substantially cylindrical housing with a closed lower end, agitating means mounted at said lower end, an elastomeric piston riding vertically within said cylinder, said piston having a small aperture passing through it, means for laterally expanding said elastomeric piston against the walls of the cylinder to frictionally fix the piston in a selected position and to frictionally seal the portion of the cylinder below the piston and means for sealing said aperture.

2. The apparatus of claim 1 wherein said piston comprises an upper and a lower disk of rigid material and an intermediate elastomeric disk and the means for expanding the piston comprising means for bringing the upper and lower disks toward each other with attendant pressure being exerted on the intermediate elastomeric disk.

3. The apparatus of claim 1 wherein said agitating means comprise a plurality of rotating blades.

4. The apparatus of claim 1 wherein said means for expanding the piston comprise an inflatable annular tube around the circumference of said piston and means for supplying gas to said inflatable tube.

5. The apparatus of claim 2 wherein the means for bringing the upper and lower disks together comprise screw means.

References Cited

UNITED STATES PATENTS 2,449,578  9/1948  Barr _____ 259—122

FOREIGN PATENTS 360,275  4/1906  France.

WILLIAM I. PRICE, *Primary Examiner.*